Sept. 30, 1947.                P. POOTJES                2,428,241
           HOUSING WITH ROTARY VALVE AND SEALING MEMBER
                    Filed Sept. 7, 1943        3 Sheets-Sheet 1
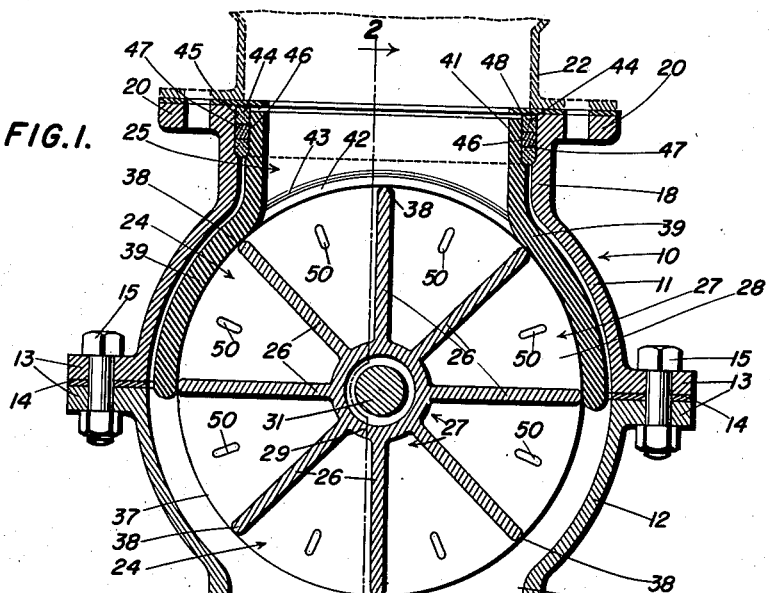
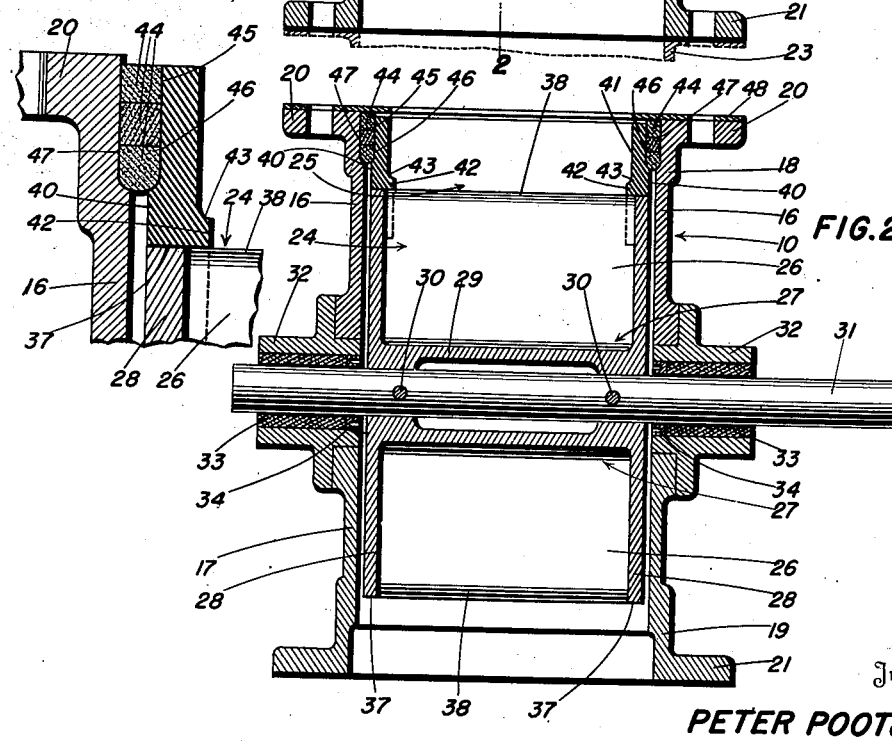
Inventor
PETER POOTJES
By Alfred W. Knight
Attorney

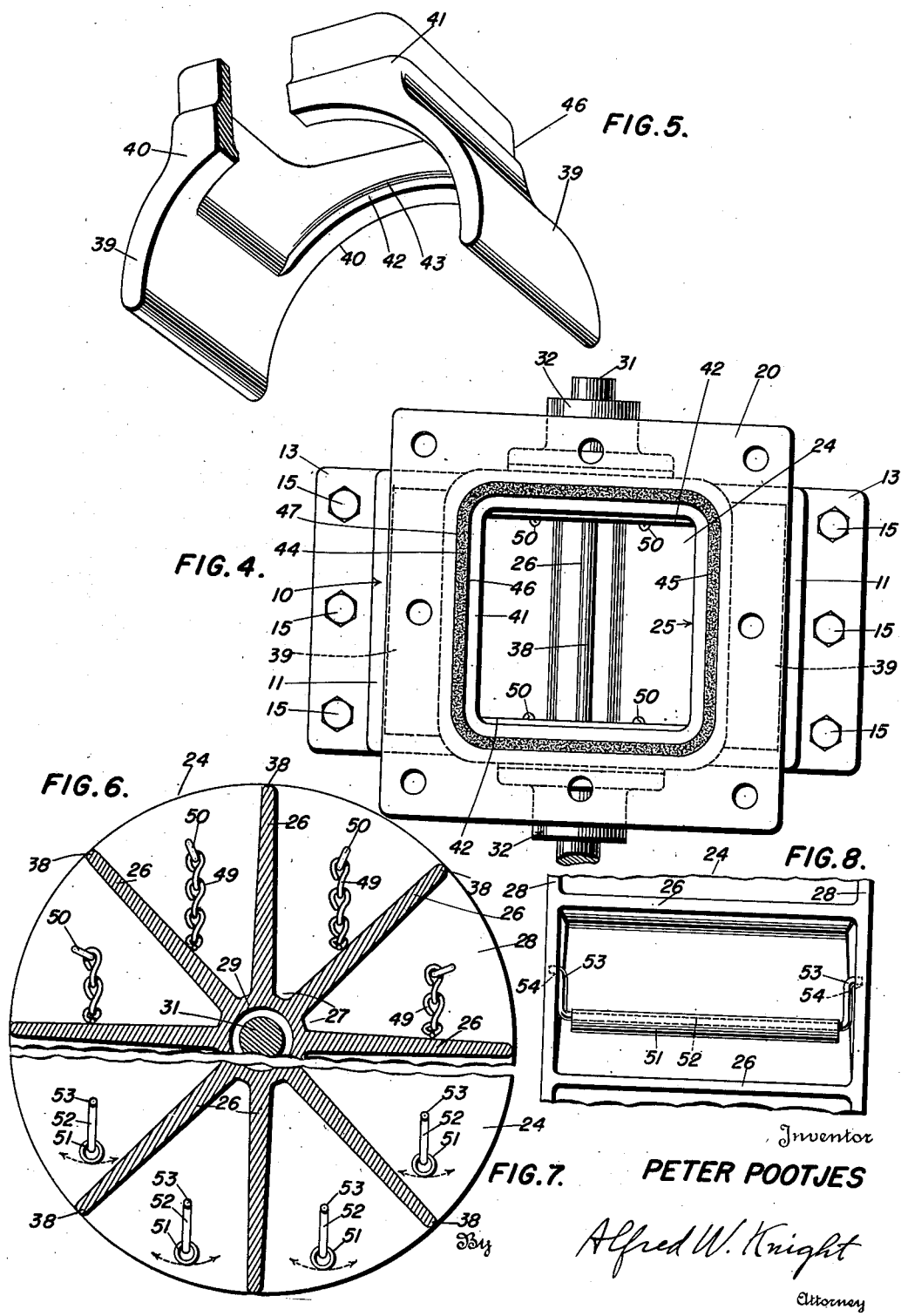

Sept. 30, 1947.  P. POOTJES  2,428,241
HOUSING WITH ROTARY VALVE AND SEALING MEMBER
Filed Sept. 7, 1943  3 Sheets-Sheet 3

Inventor
PETER POOTJES
By Alfred W. Knight
Attorney

Patented Sept. 30, 1947

2,428,241

UNITED STATES PATENT OFFICE 2,428,241

HOUSING WITH ROTARY VALVE AND SEALING MEMBER

Peter Pootjes, Temple City, Calif., assignor to Western Precipitation Corporation, Los Angeles, Calif., a corporation of California Application September 7, 1943, Serial No. 501,475

3 Claims. (Cl. 222—368)

This invention relates to rotary valves for transferring mobile material between compartments and particularly to rotary valves for handling powdered or granular material that tends to leak or flow around the valve.

The tendency towards leakage increases when there is an appreciable difference between the air or gas pressures at opposite sides of the rotary valve; and this condition is frequently encountered; for example, in feeding finely divided material into an enclosed compartment such as a furnace, a reaction chamber or a flue through which a gas stream is flowing, and in discharging dust from the hopper of a cyclone separator into a bin under atmospheric pressure. The powdered or granular material is frequently of an abrasive nature, and some of the previously proposed arrangements for sealing the rotary valves against leakage have been unsatisfactory in view of the rapid wear of the rotor and the sealing members.

An object of the invention is to provide a rotary transfer valve having a sealing member that conforms to and rides upon the periphery of the circular end walls and the blades of the rotor element, the sealing member having a neck portion through which the material flows to the rotor element, packing being arranged between the neck portion and the valve housing to establish a tight joint through which neither dust nor gas may escape under ordinary working conditions.

An object is to provide a unitary, relatively heavy sealing member which gravitates to its sealing position and therefore maintains a floating relationship with the rotary valve, the sealing member having a neck which extends into an opening of the valve housing to receive a packing which not only augments the sealing function but also keeps the sealing member in a centralized position.

A further object of the invention is to provide a relatively heavy sealing member of the foregoing description, which, because of its extended bearing surfaces, will be subject to a minimum amount of wear and which will compensate for such wear as must occur.

A further object of the invention is to provide a sealing member having an arched under face which provides a close sealing engagement with the circular end walls and blade tips of a rotary valve, the member having a substantial weight so that it can stay in place solely by gravity.

Another object of the invention is to provide a rotary valve having simple yet effective devices, preferably within the rotary valve pockets, for agitating the material to facilitate the complete discharge of the material from the valve.

Other objects and advantages will appear in the following specification, reference being had to the accompanying drawings in which:

Figure 1 is a central, vertical section of a rotary valve or roll feeder embodying the invention;

Figure 2 is a central, vertical section taken on the line 2—2 of Fig. 1;

Figure 3 is a detail sectional view of portions of the neck and housing, particularly showing the packing;

Figure 4 is a plan view of the structure in Fig. 1;

Figure 5 is a perspective view of the improved sealing member, a portion being broken away;

Figure 6 is a sectional view of a portion of a rotor showing one type of agitating device in the pockets;

Figure 7 is a sectional view of a portion of a rotor showing another type of agitating device in the pockets;

Figure 8 is a detail elevation of a portion of the rotor of Fig. 7;

Figure 9:
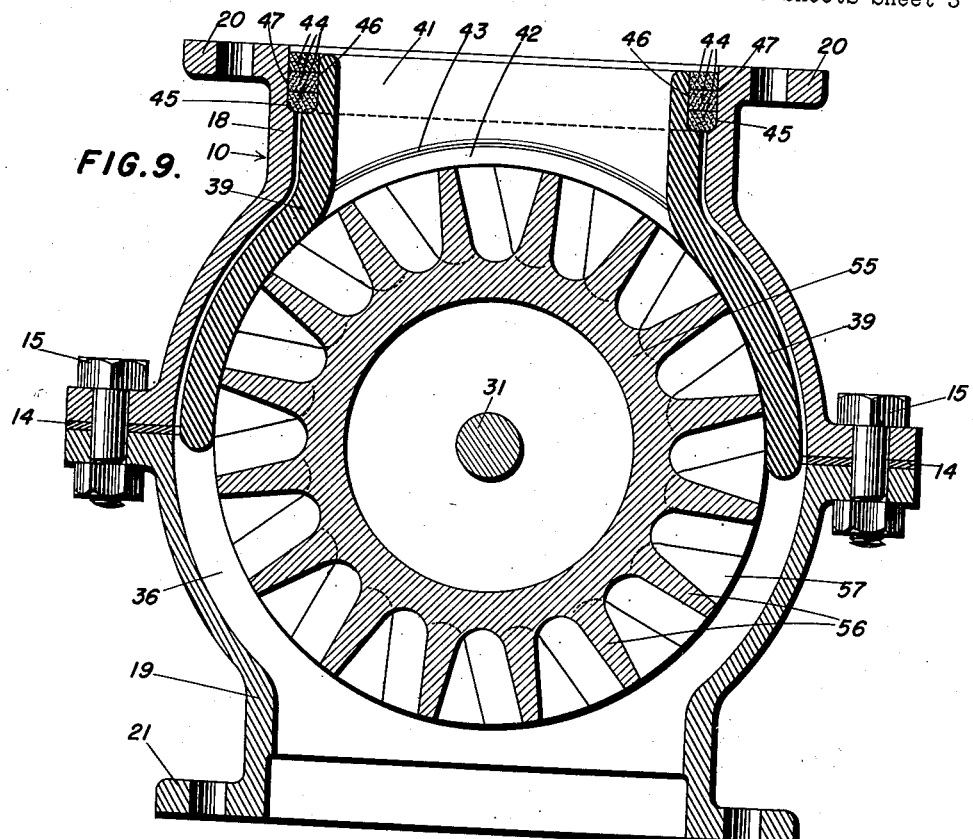
Figure 9 is a central, vertical section of a modified form of rotor.

In the drawings, the reference numeral 10 identifies a housing which comprises substantially identical castings 11, 12 having flanges 13 which are secured together upon a gasket 14 by bolts 15 or the like. The flat end walls 16, 17 (Fig. 2) of these castings merge into the wall portions 18, 19 that form the inlet and outlet openings of the housing, the respective ones 18 and 19 being flanged at 20, 21 for attachment in a dust conduit. This conduit may comprise a hopper 22 and bin 23 (dotted lines, Fig. 1) which, broadly speaking, constitute a pair of storage compartments. A rotary valve 24 is supported within the housing 10 to transfer the material from the compartment 22 to the compartment 23. The material may be in granular or powdered form and the pressures may either be the same in both compartments or they may be different. According to the present invention, a relatively heavy cast sealing member 25 of novel form cooperates with the housing 10 and valve 24 to transfer the material from one compartment to the other against the outflow or inflow of gas or air, should there be a predominating pressure in either one, and to prevent the escape of dust if one of the compartments is open to surrounding outer atmosphere.

The valve 24 has radial blades 26 which divide the rotor into pockets 27 that are closed by circular end plates 28. The blades 26 and end plates 28 are usually, but not necessarily, made integral with each other and with a hub 29. This hub is secured by taper-pins 30 (Fig. 2) or their equivalents to a shaft 31. Any conventional drive (not shown) may be coupled to the shaft to rotate it and consequently the rotary valve 24, at the desired speed and either continuously or intermittently. Suitable bearings 32, affixed to the end walls 16, support the shaft. These bearings desirably have carbon bushings 33 and terminal packings 34. The rims 37 of the rotor end plates 27, and the edges 38 of the radial partitions 26 lie in the surface of a right circular cylinder, and the lower surfaces of the saddle portion 39 and of the end walls 40 of the sealing member are also cylindrical and have the same radius. The circumferential length of each cylindrical segment of the saddle portion 38 is somewhat greater than the circumferential spacing of the radial blades 26 that divide the rotor into pockets 27, see Fig. 1. The upper portion or neck 41 of the sealing member extends upwardly into the inlet passage, and is spaced from the wall 18 of the passage on all sides. The outer end surfaces 40 of the sealing member are preferably substantially flush with the outer surfaces of the end plates 28 of the valve, see Fig. 3, and ribs 42, with filletted upper surfaces 43, project inwardly beyond the rims 37 of the end plates to deflect the dust or other mobile material from the joints between the rotor end plates and the sealing member.

Gaskets or other packing material 44 are fitted into the recess 45 formed by confronting rabbets 46, 47, respectively, on the outside of the neck 41 and on the inside of the inlet 18. This packing prevents leakage around the outside of the sealing member 25 and is of a yielding nature to maintain a tight seal even though the sealing member 25 drops slightly as a result of wear on its lower face and on the peripheral surfaces of the rotor. A gasket 48 between the hopper 22 and housing inlet 18 partly overlies the packing 44. The sealing member 25 is a relatively heavy casting that is held by its weight, and in part by the pressure exerted by the mobile material upon the upper edge of the neck 41, in close engagement with the rotor. Wear of the engaging surfaces is at a relatively slow rate in view of the large areas in contact, and the sealing member 25 drops down by gravity to maintain an effective seal.

Some powdered materials and some dusts removed by cyclone separators may form compact masses that adhere to the rotor 24. Two types of agitating devices for insuring the discharge of powdered material from the rotary valve are illustrated in Figs. 6, 7 and 8. The first type, shown in Fig. 6, comprises chain or similar loops 49 which are hung loosely in the rotor pockets 27 by eyes 50 on the end plates 28. These loops may consist of loosely coupled elements other than chain links, their function being to drop by gravity to break up compacted masses of the powdered material and to beat upon the blades 26 during rotation of the valve, thus preventing the material from adhering to the walls of the pockets. It is contemplated that the valves will be used either with or without the agitating means, depending upon the character of the material to be handled, and, for a graphical illustration of this option, only the eyes 50 are illustrated in Figs. 1 and 4.

As shown in Figs. 7 and 8, the agitating means comprises tubing 51, either in one piece or in a number of short sections, mounted on spring wire carriers 52. The tubing is oversize in bore to allow movement of the tubing on its support to break adhesions and to strike and scrape along the radial blades 26, thereby achieving the result described for the chain loops. Each wire carrier is bent into bail form (Fig. 8) and then outwardly at 53 to seat in holes 54 in the circular end plates 28. The ends 53 may be fitted into the holes or released therefrom by bending or springing the resilient carrier wire. In order to maintain the desired seal, the holes 54 extend only partially through the end plates 28.

Figure 10:
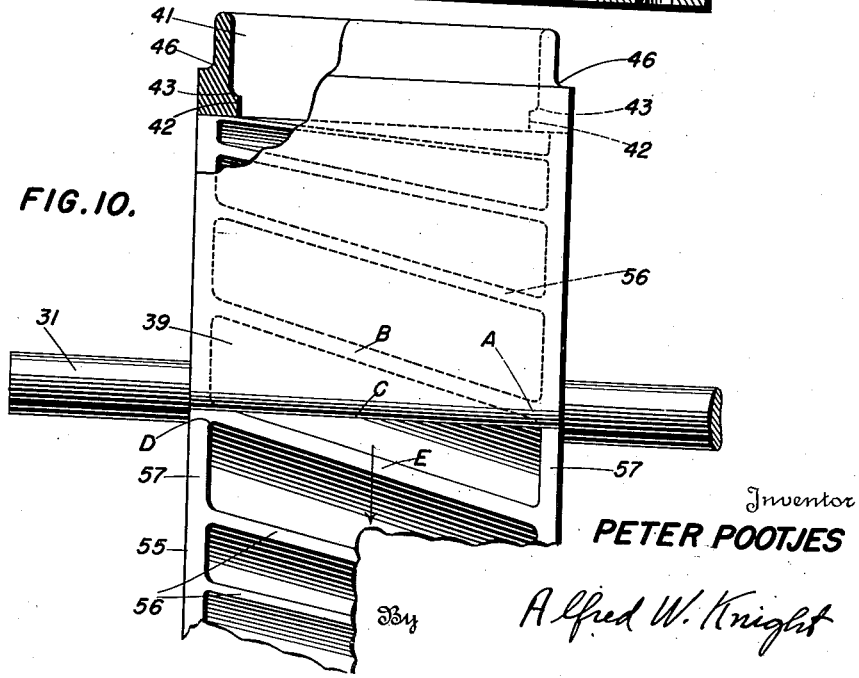
Figure 10 is an elevation of the rotor and sealing member in Fig. 9, a portion of the latter being broken away, particularly illustrating the helical form of blades.

Rotary valves such as illustrated in Figs. 1 to 8 may be employed in material feeding operations in which a periodic discharge of equal quantities of material into a treating chamber or furnace is satisfactory, but a continuous feed at a substantially uniform rate may be required in other cases, for example when the material is fed into a moving stream of air or gas. A rotary valve 55 for effecting a substantially continuous uniform feed of powdered material is illustrated in Figs. 9 and 10. Since the housing 10, sealing member 25 and related parts are identical with those illustrated in Figs. 1 to 5; corresponding numerals are used throughout without the unnecessary repetition of the description. The blades 26 of the rotor 55 merge with the circular end plates 57 to define pockets as before. These blades are inclined or helical, as best shown in Fig. 10, so that as each blade clears the lower edge of the sealing member 39 it causes a progressive discharge of the pocketed material along the length of each blade. The blades 56 are spaced more closely than in the previously described construction and the inclination of the blades to the axis of the shaft 31 is relatively low, thereby to prevent a sliding of the material axially of the blades to discharge the entire pocket as soon as the leading edge of a blade clears the sealing member 39. A substantially uniform discharge rate is obtained when the trailing end of one pocket clears the edge of the sealing member at substantially the instant that the leading edge of the adjacent pocket moves below the sealing member. For example, in Fig. 10 the leading end A of the pocket back of blade B arrives at and passes the edge C of the sealing member 39 as the trailing end D of the preceding blade E breaks contact with the sealing edge C.

It is to be understood that the features of the modifications may be embodied in one feeder valve either singly or collectively. For instance, the agitating means of Fig. 6 or Figs. 7 and 8 may be employed with the rotor in Fig. 1, while the blades of the rotor may be in radial planes, as shown in Figs. 1 to 5, or may be helical, as shown in Figs. 9 and 10. Preferred embodiments of the invention have been illustrated and described but it is to be understood that other modifications fall within the spirit of my invention as set forth in the following claims.

I claim:

1. A mechanism for controlling the transfer of mobile material comprising: a housing, a pocketed rotor, and a unitary substantially rigid sealing member; said housing having an intermediate portion and an inlet portion at the top thereof and an outlet portion at the bottom thereof, said rotor being positioned within said intermediate portion, and said sealing member being positioned between said housing and said rotor and having an open ended neck portion extending upwardly into the inlet portion of said housing and also having a saddle portion of such size and so positioned as to engage a portion of the upper half of the rotor, the engaging surfaces on said saddle portion and said rotor closely conforming to each other, and the sealing member being supported by said rotor and free to move vertically downwardly as a unit by gravity to compensate for wear and to maintain sealing contact with said rotor.

2. A dispensing mechanism for controlling the transfer of mobile material, comprising a housing, a pocketed rotor and a unitary substantially rigid sealing member, said housing having an enlarged intermediate portion, a substantially vertically extending reduced neck portion at the top thereof forming an inlet and an outlet portion at the bottom thereof, said rotor being positioned within said intermediate portion, and said sealing member being positioned between said housing and rotor and supported by the latter, said sealing member having a reduced neck portion conforming with the neck portion of said housing and also having a semi-cylindrical saddle portion conforming with the adjacent portion of the rotor, said saddle portion being of such size and so positioned as to engage only the greater portion of the upper half of the rotor, the sealing member being free to move vertically downwardly as a unit to compensate for wear and to maintain sealing contact with said rotor.

3. A dispensing mechanism for controlling the transfer of mobile material, comprising a housing, a pocketed rotor and a unitary substantially rigid sealing member, said housing having an enlarged intermediate portion, a reduced neck portion at the top thereof forming an inlet and an outlet portion at the bottom thereof, said rotor being positioned within said intermediate portion, and said sealing member being positioned between said housing and rotor and having a reduced neck portion conforming with the neck portion of said housing and also having a saddle portion the inner surface of which closely conforms with the adjacent portion of said rotor, the saddle portion of the sealing member being of such size and so positioned as to engage only the greater portion of the upper half of the rotor, the sealing member being supported by said rotor and free to move vertically downwardly as a unit to compensate for wear and to maintain sealing contact with said rotor.

PETER POOTJES.

REFERENCES CITED

The following references are of record in the file of this patent:

UNITED STATES PATENTS

| Number | Name | Date |
| --- | --- | --- |
| Re. 20,440 | Westberg et al. | July 6, 1937 |
| 941,024 | Mantius | Nov. 23, 1909 |
| 967,075 | Sparrow | Aug. 9, 1910 |
| 1,133,503 | Ralston | Mar. 30, 1915 |
| 1,937,747 | Creasey | Dec. 5, 1933 |
| 2,011,133 | Yoss | Aug. 13, 1935 |
| 2,161,553 | Westberg et al. | June 6, 1939 |
| 1,096,785 | Jensen | May 12, 1914 |
| 1,831,491 | Hansen | Nov. 10, 1931 |
| 2,084,764 | Constantin | June 22, 1937 |
| 2,115,167 | Hoke | Apr. 26, 1938 |
| 1,477,246 | Conklin | Dec. 11, 1923 |
| 2,054,522 | Richert | Sept. 15, 1936 |